United States Patent Office 3,743,659
Patented July 3, 1973

3,743,659
SUBSTITUTED ISOCHROMANS AND
PROCESSES THEREFOR
Murle W. Klohs, Tarzana, Calif., and Francis J. Petracek,
Bloomington, and Nobuyuki Sugisaka, New Brighton,
Minn., assignors to Riker Laboratories, Inc., Northridge, Calif.
No Drawing. Continuation-in-part of abandoned application Ser. No. 855,457, Aug. 25, 1969. This application Aug. 25, 1971, Ser. No. 174,992
Int. Cl. C07d 7/20
U.S. Cl. 260—345.2
79 Claims

ABSTRACT OF THE DISCLOSURE

Amino-substituted 1-phenyl isochromans of the formula

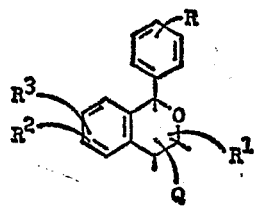

wherein R is hydrogen, lower alkyl, halogen, trifluoromethyl, amino, N-lower alkylamino or N,N-di-lower alkylamino; $R^1$ is hydrogen or lower alkyl, $R^2$ and $R^3$ are each hydrogen, lower alkyl, lower alkoxy, hydroxy, halogen or trifluoromethyl and Q is a radical attached to either the 3 or 4 position, having the structure

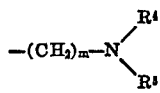

wherein $R^4$ and $R^5$ are independently hydrogen, lower alkyl or hydroxy-lower alkyl or, when taken together with the nitrogen atom to which they are attached, form a 5- or 6-membered nitrogen-containing ring having from 3 to 5 carbon atoms in the ring, one of which may be replaced by an oxygen atom, m is zero to 4 and when m is 1 or more, the alkylene chain may contain a substituent methyl group; and salts thereof. Processes for the preparation of said intermediate compounds and final products are disclosed. The final products of the invention have utility as CNS-active agents, e.g. anticonvulsants, antidepressants and anorectic agents.

This application is a continuation-in-part of our prior copending application entitled "Amino-substituted 1-Phenylisochromans and Intermediates Obtained in the Synthesis Thereof," Ser. No. 855,457, filed Aug. 25, 1969, now abandoned.

This invention relates to amino-substituted isochromans, to intermediates obtained and used in the synthesis thereof and to processes for the synthesis thereof.

BACKGROUND OF THE INVENTION 1-phenylisochroman is known, as are derivatives of isochroman, for example as shown in U.S. Pat. 2,701,254 which describes derivatives of isochroman in which cyano, carbamoyl or carboxy substituents are present on the benzene ring thereof. Flavones and flavanoid compounds are known, in which a chroman or chromone ring structure is present, flavones as such being 2-phenylchroman. U.S. Pats. 3,410,851 and 3,450,717 disclose numerous derivatives of flavone. Derivatives of chroman are also shown in U.S. Pat. 3,103,515. However, the compounds of the prior art are significantly different from those of the present invention, and so far as is known to applicants, 1 - phenylisochromanone or 1 - phenalkylisochromanone and derivatives of 1-phenylisochroman and 1-phenalkylisochroman of the type disclosed herein have not been heretofore described.

DESCRIPTION OF THE INVENTION

The final products of the invention have the formula

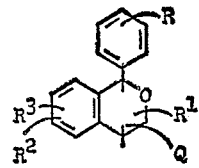

Formula I wherein R is hydrogen, lower alkyl, halogen, trifluoromethyl, amino, N-lower alkylamino or N,N-di-lower alkylamino; $R^1$ is hydrogen or lower alkyl, $R^2$ and $R^3$ are each hydrogen, lower alkyl, lower alkoxy, hydroxy, halogen or trifluoromethyl and Q is a radical attached to either the 3 or 4 position, having the structure

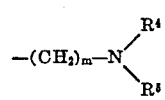

wherein $R^4$ and $R^5$ are independently hydrogen, lower alikyl or hydroxy-lower alkyl or, when taken together with the nitrogen atom to which they are attached, form a 5- or 6-membered nitrogen-containing ring having from 3 to 5 carbon atoms in the ring, one of which may be replaced by an oxygen atom, m is zero to 4 and when m is 1 or more, the alkylene chain may contain a substituent methyl group; and salts thereof.

The intermediate compositions have the formula

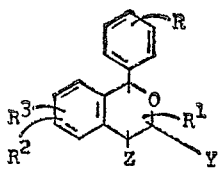

Formula II wherein R, $R^1$, $R^2$ and $R^3$ have the significance set forth hereinabove with respect to Formula I, and Y is hydrogen, hydroxy, halogen, nitro-lower alkyl or halo-lower alkyl, and Z is hydrogen, except that when Y is hydrogen, Z is halogen or cyano.

The compounds of the invention can be made by one or more of several processes, described herein as processes A, B, C and D.

In process A, a selected 1-phenyl-3-isochromanone is reduced to form the corresponding 3-hydroxy-1-phenylisochroman, which is in turn nitroalkylated, e.g. nitromethylated by condensation with nitromethane, in the presence of a tri-lower alkylamine basic catalyst. The 3-nitroalkyl-1-phenylisochroman thus obtained is then converted to the final product by reduction of the nitro radical to the amine radical.

In process B, a selected 1-phenyl-3-isochromanone is brominated to form the corresponding 4-bromo-1-phenyl-3-isochromanone, which is in turn treated with diborane to open the heterocyclic ring and form a 2-bromo-o-(α-hydroxy-lower alkyl)-phenyl-2-phenethyl alcohol intermediate, followed by dehydration to effect ring closure and formation of a 4-bromo-1-phenylisochroman. This intermediate is then directly aminated by treatment with excess ammonia or an amine to give the corresponding 4-amino - 1 - phenylisochroman, which is then reduced to yield the corresponding 4-aminomethyl-1-phenylisochroman.

As used in Formula I and Formula II, the terms "lower alkyl" and "lower alkoxy" include both straight and branched chain alkyl and alkoxy radicals, respectively, containing from 1 to 6 carbon atoms, for example, but without limitation, those wherein the alkyl group is methyl, ethyl, n-propyl, isopropyl, n-butyl, tert-butyl, n-amyl, sec-amyl, n-hexyl, 2-ethylbutyl, 2,3-dimethylbutyl and the like. The ring system formed by taking $R^4$ and $R^5$ together with the nitrogen atom to which they are attached includes pyrrolidino, piperidino, morpholino, piperazino, N-lower alkylpiperazino, N-phenylpiperazino and the like. The term "halogen" includes chlorine and fluorine.

The claimed compounds in the form of their acid-addition salts are solid crystalline materials. Spectral data and elemental analysis, taken together with the aforementioned physical characteristics, the nature of the starting materials and mode of synthesis, positively confirm the structure of the compounds sought to be patented.

The claimed final products of Formula I have significant pharmacological activity as agents acting on the mammalian central nervous system. Some of them are especially useful as anorectic agents, as determined by recognized and accepted pharmacological test procedures. Compounds of the invention also exhibit anticonvulsant and antidepressant activity.

The intermediate, Formula II, compositions are valuable chemical intermediates in preparation of the compounds of Formula I.

The processes of the invention can be generally described by reaction sequence as follows:

Process A is illustrated by the following equations showing preparation of 3-aminomethyl-1-phenylisochroman.

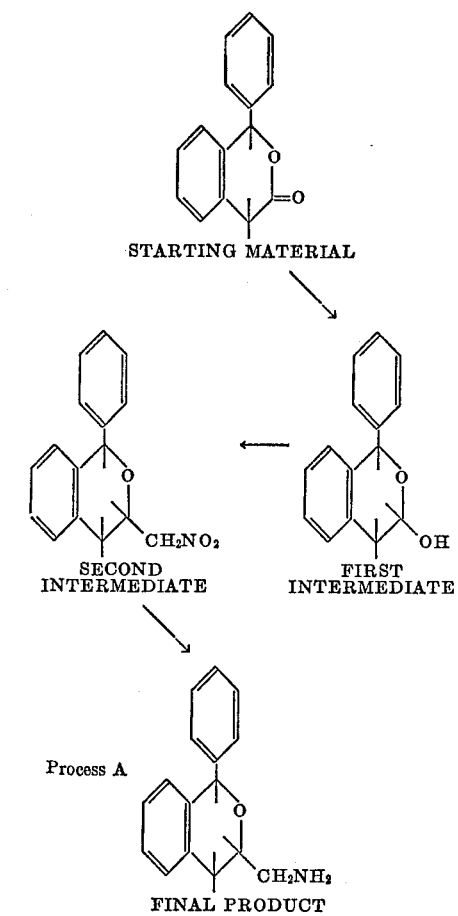

STARTING MATERIAL

SECOND INTERMEDIATE  FIRST INTERMEDIATE

Process A

FINAL PRODUCT

The starting material used in process A is 1-phenyl-3-isochromanone which is readily prepared by borohydride reduction of the carbonyl group of o-benzoylphenylacetic or o-(ω-phenylalkanoyl)phenylacetic acid, which reduction is accompanied by a spontaneous lactonization to the corresponding 1-phenyl-3-isochromanone.

The 1-phenyl-3-isochromanone starting material is converted into the corresponding 3-hydroxy-1-phenylisochroman intermediate by treatment with a reducing agent such as, for example, diborane or diisobutyl aluminum hydride in the presence of an inert organic solvent such as tetrahydrofuran, benzene, toluene and the like at a temperature in the range of from —50° C. up to the reflux temperature of the solvent used, but not more than about 65° C.

The 3-hydroxy-1-phenylisochroman intermediate is then converted to the corresponding 3-nitroalkyl-1-phenylisochroman intermediate by treatment with a nitroalkane, e.g. nitromethane in the presence of trimethylamine or triethylamine as a basic catalyst in an inert solvent, such as isopropanol, at the reflux temperature of the solvent used. In conversion of this intermediate to the final product the nitro group is reduced to amine by catalytic hydrogenation in the presence of an inert solvent, over an appropriate catalyst, such as, for example Raney nickel, palladium over carbon, platinum oxide and the like at a temperature of up to about 80° C., to yield the final product. These final products can be recovered by conventional techniques of isolation and purification.

Process B is illustrated by the following reaction sequence showing production of 4-amino or aminomethyl substituted 1-phenyl isochroman compounds. In these formulae $R^4$ and $R^5$ are hydrogen or lower alkyl, or, when taken together with the nitrogen atom to which they are attached, form a saturated heterocyclic ring having from 3 to 5 carbon atoms.

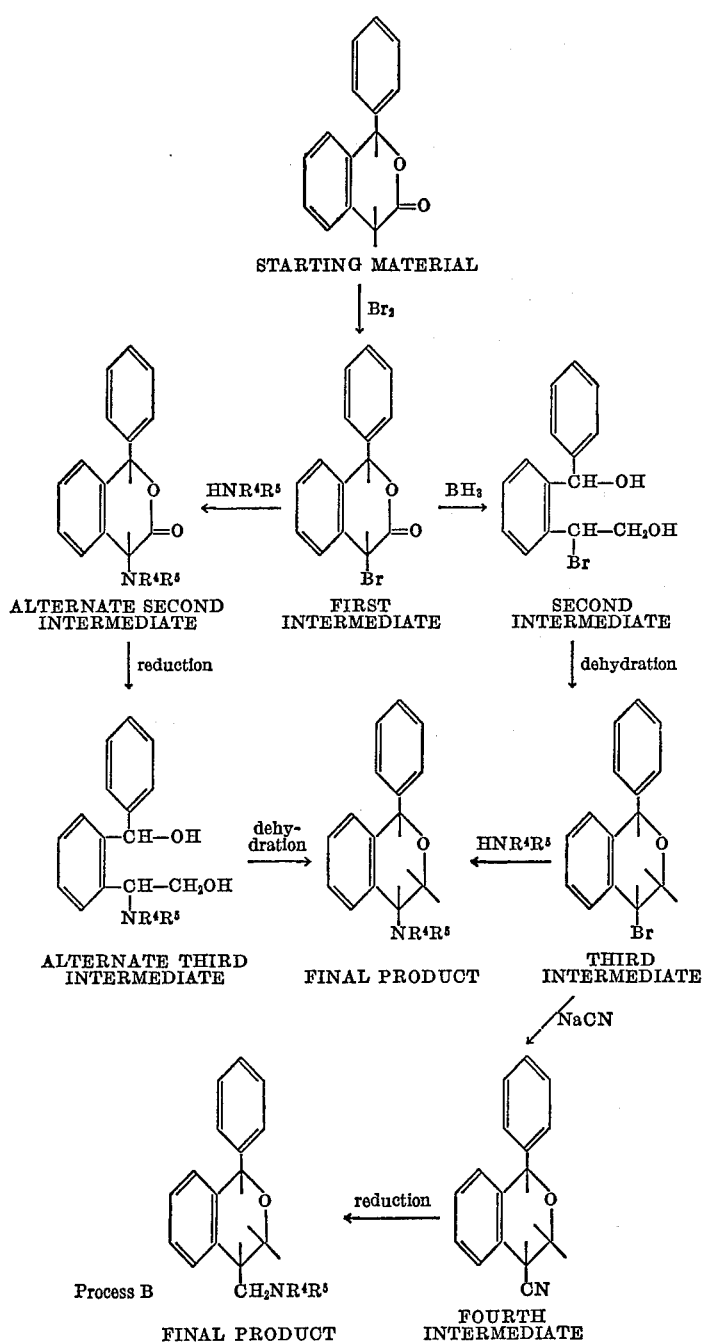

According to one route described in the reaction sequence the 1-phenyl-3-isochromanone starting material is converted to the corresponding 4-bromo-1-phenyl-3-isochromanone by treatment with bromine in the presence of an inert organic solvent such as, for example, carbon tetrachloride. The reaction is carried out at a temperature ranging from room temperature up to the reflux temperature of the solvent used. The 4-bromo-1-phenyl-3-isochromanone intermediate thus obtained is recovered by conventional techniques of isolation and purification.

Treatment of the 4-bromo-1-phenyl-3-isochromanone with ammonia, lower-alkyl or di-lower-alkylamine or a saturated heteromonocyclic base at room temperature in the presence of an inert organic solvent such as, for example, ether, results in the formation of the corresponding 4-amino-, 4-(lower alkyl)amino-, 4-(di-lower alkyl)amino-, or 4 - (heterocyclic)-1-phenyl-3-isochromanone (described in the reaction sequence as the alternate second intermediate) intermediate which is recovered by conventional techniques of isolation and purification and then treated with a hydride reducing agent such as, for example, lithium aluminum hydride, or diborane or any similar reducing agent, in the presence of an inert organic solvent such as, for example, tetrahydrofuran, and at the reflux temperature of the solvent used, to form corresponding 1-amino- or 2-(saturated heteromonocyclic base)-o-(α-hydroxybenzyl)-2-phenethyl alcohol, described herein as the third alternate intermediate. The product of the reaction is preferably used in the next step of the synthesis, after isolation by conventional procedures, without further purification.

Ring closure and conversion of the phenethyl alcohol intermediate to the corresponding 4-amino-, 4-(lower alkyl)amino-, 4-(di-lower alkyl)amino-, or 4-(saturated heterocyclic) - 1 - phenyl - isochroman final product is achieved by dehydration of the alcohol with an acid such as, for example, p-toluenesulfonic acid, hydrobromic acid, gaseous hydrogen bromide and the like, in the presence of an inert non-hydroxylic organic solvent such as, for example, chloroform, and at a temperature in the range from 25° C. up to the reflux temperature of the solvent used.

According to the second route described in the reaction sequence, the 1-phenyl-3-isochromanone starting material is converted to the corresponding 4-bromo-1-phenyl-3-isochromanone by treatment with bromine in the presence of an inert organic solvent such as, for example, carbon tetrachloride. The reaction is carried out at a temperature of up to the reflux temperature of the solvent used. The 4-bromo - 1 - phenyl-3-isochromanone intermediate thus obtained is recovered by conventional techniques of isolation and purification.

Conversion of the 4-bromo-1-phenyl-3-isochromanone intermediate to the 2-bromo-o-(α-hydroxybenzyl-2-phenethyl alcohol (first intermediate) is accomplished by treatment with diborane in the presence of an inert organic solvent such as, for example, tetrahydrofuran, and at a temperature of from room temperature to the reflux temperature of the solvent used. The product of the reaction is preferably used in the next step of the synthesis, after isolation by conventional procedures, without further purification.

Ring closure and conversion of the phenethyl alcohol intermediate to the 4-bromo-1-phenylisochroman (second intermediate) is achieved by treatment of the alcohol with an acid such as, for example, p-toluenesulfonic acid, hydrobromic acid, gaseous hydrogen bromide, and the like, in the presence of an inert non-hydroxylic organic solvent such as, for example, chloroform and at a temperature of up to the reflux temperature of the solvent used.

The 4-bromo-1-phenylisochroman intermediate thus formed is then treated with sodium or potassium cyanide in the presence of an inert organic solvent such as, for example, dimethylsulfoxide, and at a temperature of up to about 80° C., to form the 4-cyano-1-phenylisochroman (third intermediate) which upon reduction with diborane in the presence of an inert organic solvent such as, for example, tetrahydrofuran, at room temperature yields the 1-phenyl-4-isochromanmethylamine final product. The compound is recovered by conventional techniques of isolation and purification.

Where the 1-phenylisochroman is to bear an amine or saturated heterocycle attached at the 4 position directly through the nitrogen atom of the substituent, the 4-bromo-1-phenylisochroman third intermediate is treated with ammonia or a primary or secondary amine in the presence of an inert organic solvent medium such as, for example, isopropanol, and at a temperature of up to the reflux temperature of the solvent used.

Where it is desired that the 4-substituent be a saturated heterocyclic base attached through its nitrogen atom, a saturated heterocyclic base is substituted for the ammonia or primary or secondary amine in carrying out the reaction sequence. The product in either case is recovered by conventional techniques of isolation and purification.

Exemplary of the primary and secondary amines and saturated heterocyclic bases that can be used in carrying out the reaction sequence comprising the invention in its second process aspect are: butylamines, e.g.

n-, sec-, tert-butylamine,
di-n-butylamine,
methylamine,
diethylamine,
di-n-hexylamine,
diisopropylamine,
isoamylamine,
propylamine,
cyclopropylamine,
cyclobutylamine,
cyclopentylamine,
cyclohexylamine,
N-methylcyclobutylamine,
N-methylcyclohexylamine,
N-ethylcyclopentylamine,
N-propylcyclohexylamine,
N-n-butylcyclopentylamine,
N-amylcyclohexylamine,
N-hexylcyclohexylamine,
N-isobutylcyclopentylamine,
N-sec-butylcyclohexylamine,
pyrrolidine,
piperidine,
piperazine,
morpholine,
1-, 3- or 3-methylpyrrolidine,
1-ethylpyrrolidine,
1-n-butylpyrrolidine,
1,2-dimethylpyrrolidine,
2,5-dimethylpyrrolidine,
1,3-diethylpyrrolidine,
2-ethyl-4-methylpyrrolidine,
3-methyl-2-propylpyrrolidine,
2-butyl-4-methylpyrrolidine,
3-sec-butyl-1-methylpyrrolidine,
1,2,4-trimethylpyrrolidine,
3-methylpiperidine,
4-ethylpiperidine,
1-n-propylpiperidine,
1-isopropylpiperidine,
1-(2-ethylbutyl)piperidine,
1,4-diethylpiperidine,
4-isopropyl-1-methylpiperidine,
2-isopropyl-1-n-propylpiperidine,
2-methylpiperazine,
1-n-propylpiperazine,
1,3-dimethylpiperazine,
2,5-dimethylpiperazine,
2,5-diethylpiperazine,
2,5-diisobutylpiperazine,
1,4-diisopropylpiperazine,
2-ethyl-5-methylpiperazine,
1,3,5-trimethylpiperazine,
2,2,3-trimethylpiperazine,
4-methylmorpholine,
4-n-propylmorpholine,
2-isopropylmorpholine,
4-isopentylmorpholine,
2,4-dimethylmorpholine,
3,5-dimethylmorpholine,
4-ethyl-2,6-dimethylmorpholine and
4-isopentyl-2,6-dimethylmorpholine.

The use of any one of these primary or secondary amines, or saturated heterocyclic bases, is fully equivalent to the use of the specific amines used in the examples and is included within the scope of the present invention.

Process C comprises reacting a selected phenyl Grignard reagent with an ω-chloro-1,2-epoxy-lower alkane to form an α-(ω-chloro-lower alkyl)phenethyl alcohol intermediate which is then cyclized to give the corresponding 3-(ω-chloro-lower alkyl)-1-phenylisochroman intermediae. This compound is then easily directly aminated to form the 3-(ω-amino - lower alkyl) - 1 - phenylisochroman final product.

Process D comprises converting a selected 1-phenyl-3-isochromancarboxylic acid to the corresponding carboxylic acid amide which is then reduced to the corresponding 1-phenyl-3-isochromanmethylamine. Another approach consists in forming the corresponding nitrile which is treated e.g. with ethylene diamine. ½ hydrochloride, to produce the 3-imidazolinyl-1-phenylisochroman.

The 3-amino-lower alkyl-1-phenylisochroman and 4-aminomethyl-1-phenylisochroman compounds are readily converted to the equivalent N,N-di-lower alkyl-substituted derivatives by means of reductive alkylation through treatment with an appropriate aldehyde or ketone in the presence of an inert solvent and with the aid of a catalyst such as palladium over carbon. Where straight chain lower alkyl substitution on the amino nitrogen atom is desired, a straight chain aldehyde is employed, for example, methyl substituents result from the use of formaldehyde, ethyl from acetaldehyde, propyl from propionaldehyde, n-butyl from butyraldehyde; where branched chain lower alkyl substitution is desired, with attachment to the nitrogen atom through a carbon atom removed from the point of branching by one or more carbon atoms, a branched chain aldehyde is employed, for example, isobutyl (—CH$_2$CH(CH$_3$)$_2$) substituents result from the use of isobutyraldehyde, iso-amyl (—CH$_2$CH$_2$CH(CH$_3$)$_2$) from iso-valeraldehyde; and where branched chain lower alkyl substitution is desired, with attachment to the nitrogen atom through the carbon atom forming the point of branching, a ketone is employed, for example isopropyl substituents result from the use of acetone, sec-butyl

from diethyl ketone.

Where the desired compound is 3-(N,N-dimethylaminomethyl)-1-phenyl-3-isochroman, the preferred method of converting the unsubstituted amino radical is through the use of the well-known Leuckart reaction. Also, in accordance with one procedure, N-lower alkyl substituted derivatives are formed by conversion of the free amine first to the corresponding amide by treatment with an appropriate acid-anhydride reagent. The chain length of the mono-lower alkyl substituent in the final product is dependent upon the nature of the anhydride reagent used in forming the amide. Accordingly, acetic-formic anhydride reagent [J. Org. Chem. 23: 728 (1958)] is used to prepare the monomethyl substituent, acetic anhydride the mono-ethyl, propionic acid anhydride the mono-n-propyl, etc. The amide thus formed is then reduced with a hydride reducing agent such as lithium aluminum hydride to yield the N-lower alkyl substituted derivative.

In accordance with an alternate procedure, the free amine is treated with a lower alkyl, for example ethyl, ester of a chlorocarboxylic acid followed by reduction of the resulting intermediate with lithium aluminum hydride. Where an N-methylamino radical is desired, a chloroformate ester is used.

The products of these reactions are recovered by conventional techniques of isolation and purification.

The claimed intermediate and final compounds of the invention are capable of existing in both cis- and trans-isomeric form, each having a different melting point. It is recognized that such isomers may differ in degree of activity, the cis isomer ordinarily being more active. Mixtures of cis and trans isomers are often employed, however, and these are included within the scope of the present invention.

In any of the reaction sequences described above, starting materials can be used wherein the benzenoid portion of the isochroman nucleus and/or the phenyl substituent at the 1 position bears one or more lower alkyl, lower alkoxy or trifluoro-methyl substituents. The use of such starting materials results in the preparation of intermediates and final products bearing identical substitution as in the starting material. Such intermediate and final products have the same utility as the specific intermediates, and final products wherein the benzenoid portion of the isochroman nucleus and the phenyl substituent at the 1 position are unsubstituted, are the full equivalence thereof, and are included within the scope of this invention.

Similarly, where, in the above-depicted second reaction sequence, the 1-phenyl-3-isochromanone is treated with bromine, it is to be understood that chlorine may be substituted for the bromine and is the full equivalent thereof. The use of chlorine results in the preparation of 3-chloro-1-phenylisochroman-3-one, 4 - chloro-1-phenylisochroman and 2-chloro-o-(α-hydroxybenzyl)-2-phenethyl alcohol intermediates, which have the same utility as their specific 3-bromo-1-phenylisochroman-3-one, 4-bromo-1-phenylisochroman and 2 - bromo-o-(α-hydroxybenzyl)-2-phenethyl alcohol counterparts hereinabove described, and are included within the scope of this invention.

The final products contain a basic nitrogen atom and therefore can, if desired, be converted into their non-toxic pharmaceutically acceptable acid-addition salts. Salts which can be formed include, for example, salts with inorganic acids, such as the hydrochloride, hydrobromide, hydroiodide, sulfate, phosphate and the like. They also include salts with organic acids, including monobasic acids such as the acetate or propionate, and especially those with hydroxy organic acids, and polybasic acids, such as the citrate, tartrate, malate and maleate. Quaternary ammonium salts can also be prepared by the methods known to the art. Pharmaceutically these salts will not be substantially more toxic than the compound itself, and, to be acceptable, they should be capable of incorporation into conventional liquid or solid pharmaceutical media. Such pharmaceutically useful acid-addition salts are the full equivalents of the bases from which they are derived and are included within the scope of this invention. Because of their solubility properties they are in some cases preferred for particular uses. Also, acid addition salts are useful for preparation of the compounds because they have, generally speaking, low solubility in organic solvents and therefore can be precipitated from aqueous solution by addition of water-soluble organic solvents thereto.

The claimed final products, either as free bases or in the form of a non-toxic, pharmaceutically acceptable acid-addition salt, can be combined with conventional pharmaceutical diluents and carriers to provide such dosage forms as tablets, suspensions, solutions, suppositories and the like.

The individual unit dosage and frequency of administration is determined not only by the nature and severity of the condition for which suppresion of appetite is indicated, but in addition upon age, weight and species of subject, its underlying physical condition and the route of administration. It will, accordingly, be within the judgment and skill of the practitioner administering the drug to determine the exact amount to be administered so as to be non-toxic, yet pharmaceutically effective in suppressing appetite. However, dosage will usually be about 0.1 to 10 mg./kg. While it has been found that the final products according to the present invention are effective as anorectic agents in either of the isomeric forms referred to hereinabove, for ease of administration it is desirable to administer the compounds as mixtures of such isomers.

One preferred group of compounds of the invention is that represented by the formula

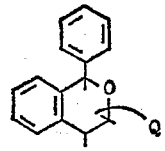

wherein Q is amino, amino-lower alkyl, lower alkylamino-lower alkyl or di(lower alkyl) amino-lower alkyl attached to the chroman ring in either the 3 or 4 position. Illustartive of compounds included within the scope of the formula for 3-aminomethyl-1-phenylisochroman, 4-aminoethyl - 1 - phenylisochroman, N,N-dimethyl-aminomethyl-1-phenylisochroman, N,N-dimethylamino-1-phenylisochroman, 3-amino-1-phenylisochroman and the like. Starting materials for these compounds are readily available. Both 3-(N-methylaminomethyl)-1-phenylisochroman and 3 - (N,N-dimethylaminomethyl)-1-phenylisochroman have demonstrated anorectic activity as good as, or better than, that produced by comparable doses of the known appetite-suppressant d-amphetamine, without exhibiting any of the central nervous system stimulation commonly observed with d-amphetamine.

Another preferred group of compounds is formed by fluorine-containing compounds of Formula I in which R is hydrogen or p-fluoro, $R^1$ and $R^2$ are hydrogen, $R^3$ is 7-fluoro, Q is amino, methylamino and dimethylamino;

and $n$ is zero or one. These compounds are particularly effective as anorectic agents.

As referred to hereinabove, the compounds of the invention have cis and trans stereoisomers. Each of the compounds of the invention can, however, exist in four different stereoisomeric forms, that is one cis and one trans form, each of which cis or trans compound exists as a $d, l$ pair. The individual $d$ and $l$ forms can be isolated by known resolution methods. Cis and trans mixtures are also obtained. All of these mixtures are generally physiologically active, but the physiological activity will vary amount the isomers of any particular compound, as is well known to the art. From the practical standpoint the mixtures, whether geometric or optical or both, are useful to obtain the pure isomer desired, as it is difficult to prepare specific isomers alone, and mixtures are ordinarily obtained from the process of preparation. Pure isomers may be desired because one of the isomers may be highly active and therefore might have a better therapeutic ratio.

The following examples are non-limiting and are more specifically illustrative of the preparation of 3- and 4-amino and aminoalkyl 1-phenyl- and 1-phenyl-lower alkylisochroman compounds of the invention.

EXAMPLE 1

(a) 3-hydroxy-1-phenylisochroman.—To a solution of 1-phenyl-3-isochromanone (19.0 g., 0.086 mole) in tetrahydrofuran (190 ml.) at 0° C. is added slowly with stirring a solution of 1 M diborane in tetrahydrofuran (95 ml.). After 60 minutes at 0° C. the reaction mixture is allowed to stand overnight at −15° C. Water is added to the reaction mixture, then the product is extracted into diethyl ether using several separate portions of ether. The ether extracts are dried over anhydrous magnesium sulfate. The solution is separated from the drying agent by filtration, then the solvent is removed by evaporation under vacuum to give a solid residue of the desired product. The product is recrystallized from a mixture of diethyl ether/petroleum ether, to give the crystalline product, M.P. 107°–110° C. The structural assignment is consistent with its infrared spectrum.

*Analysis.*—Calculated for $C_{15}H_{14}O_2$ (percent): C, 79.62; H, 6.24. Found (percent): C, 79.33; H, 6.22.

(b) 3-nitromethyl - 1 - phenylisochroman.—The total crude product obtained from the reduction, as described in "a", of 1-phenyl-3-isochromanone (100 g., 0.44 mole) is dissolved in nitromethane (500 ml.) to which is added acetic acid (5 g.) and an excess of triethylamine as a catalyst. Condensation is complete after refluxing for 14 hours. Two isomers of the product having different melting points are purified by chromatography on silicic acid/celite followed by fractional crystallization of the mixed isomers. The cis-isomer M.P. 119–122° C., is crystallized from benzene/petroleum ether.

*Analysis.*—Calculated for $C_{16}H_{15}NO_3$ (percent): C, 71.36; H, 5.61. Found (percent): C, 71.33; H, 5.39.

The trans-isomer M.P. 92°–95° C., is also obtained in crystalline form.

*Analysis.*—Calculated for $C_{16}H_{15}NO_3$ (percent): C, 71.36; H, 5.61. Found (percent): C, 71.52; H, 5.58.

(c) Trans-3-aminomethyl - 1-phenylisochroman.—The trans-3-nitromethyl-1-phenylisochroman (5 g., 0.0186 mole) is dissolved in tetrahydrofuran (20 ml.) and hydrogenated (at about 44 p.s.i.) in the presence of platinum oxide (0.3 g.). Reduction is complete at the end of two hours. The products, M.P. 62°–66° C., is converted to the hydrochloride salt, M.P. 180–182° C.

*Analysis.*—Calculated for $C_{16}H_{17}NO \cdot HCl$ (percent): C, 69.68; H, 6.58; Cl, 12.86. Found (percent): C, 69.70; H, 6.96; Cl, 12.42.

(d) Cis-3-aminomethyl - 1 - phenylisochroman.—The cis-3-nitromethyl-1-phenylisochroman (2.7 g., 0.01 mole) is dissolved in tetrahydrofuran (15 ml.) and diluted with methanol (50 ml.). The resulting solution is hydrogenated at room temperature for 3 days in the presence of platinum (0.2 g. of platinum oxide). The product is obtained as a colorless oil and then converted to the hydrochloride salt for characterization, M. 220°–224° C.

*Analysis.*—Calculated for $C_{16}H_{17}NOCl \cdot C_2H_5OH$ (percent): C, 67.17; H, 7.51; N, 4.35; Cl, 11.01. Found (percent): C, 66.56; H, 6.89; N, 4.35; Cl, 11.41.

EXAMPLE 2

(a) Trans-3-(N-methylaminomethyl) - 1 - phenylisochroman: The trans-3-aminomethyl-1-phenylisochroman (8.1 g., 0.0298 mole), obtained as described in Example 1c is treated with ethyl chloroformate (3.3 ml.) in chloroform (33 ml.) at room temperature to form trans-3-(N-carbethoxy-aminomethyl)-1-phenylisochroman, M.P. 82°–83° C.

*Analysis.*—Calculated for $C_{19}H_{21}O_3N$ (percent): C, 73.29; H, 6.80; N, 4.50. Found (percent): C, 72.51; H, 6.56; N, 4.44.

The trans-intermediate thus formed (1.87 g., 0.006 mole) in anhydrous tetrahydrofuran (30 ml.) is then added to a mixture of lithium aluminum hydride (0.46 g.) in dry ether (30 ml.) and the resulting mixture refluxed for 3 hours, then cooled and isopropanol (3.6 ml.) and saturated sodium chloride solution (2.9 ml.) added. The mixture is filtered and washed with tetrahydrofuran and ether and then evaporated to an oil. The oil is dissolved in ether, washed with water and extracted with 1 N hydrochloric acid to yield the product in the form of its hydrochloride salt on evaporation in vacuo.

*Analysis.*—Calculated for $C_{17}H_{19}NO \cdot HCl$ (percent): C, 70.45; H, 6.96; N, 4.83. Found (percent): C, 70.12; H, 6.98; N, 4.99.

(b) Cis - 3 - (N-methylaminomethyl) - 1 - phenylisochroman.—The cis - 3-aminomethyl-1-phenylisochroman (0.5 g., 0.00155 mole), obtained as described in Example 1d, is treated with ethylchloroformate (0.2 ml.) in chloroform (2 ml.) at room temperature to form cis-3-(N-carbethoxy-aminomethyl)-1-phenylisochroman, M.P. 92°–94° C.

*Analysis.*—Calculated for $C_{19}H_{21}NO_3$ (percent): C, 73.29; H, 6.79; N, 4.49. Found (percent): C, 73.38; H, 6.64; N, 4.48.

The cis-intermediate thus formed is dissolved (0.5 g., 0.0016 mole) in anhydrous tetrahydrofuran (10 ml.) and is then added to a mixture of lithium aluminum hydride (0.13 g.) in anhydrous ether (10 ml.) and the resulting mixture refluxed for 3 hours, then cooled and worked up as described in Example 2 to yield the product in the form of its hydrochloride salt, M.P. 225°–228.5° C.

*Analysis.*—Calculated for $C_{17}H_{19}NO \cdot HCl$ (percent): C, 70.45; H, 6.95; N, 4.83; Cl, 12.23. Found (percent): C, 70.68; H, 7.05; N, 4.72; Cl, 12.42.

EXAMPLE 3

(a) Trans-3-(N,N - dimethyl - aminomethyl) - 1 - phenylisochroman.—Into a solution of the trans-3-aminomethyl-1-phenylisochroman (4.6 g., 0.0186 mole) prepared as described in Example 1c, in methanol (50 ml.) is added technical grade formaldehyde (5 ml.) and acetic acid (1 ml.). The resulting solution is hydrogenated under pressure (44 p.s.i.), at room temperature and in the presence of platinous oxide (0.3 g.) as a catalyst. The hydrogenation is complete after about 2 hours. The mixture is then filtered and the filtered solution evaporated to give an oil which is dissolved in water and washed with ether. The ether washings are extracted with ether. The ether washings are extracted with water and all aqueous layers combined and basified with 6 N sodium hydroxide. The product is converted to the fumarate salt by addition of the stoichiometric amount of fumaric acid to an ether solution of the base. The salt has after recrystallization from alcohol-ether solution, M.P. 160°–162° C.

*Analysis.*—Calculated for $C_{18}H_{21}ON \cdot C_4H_4O_4$ (percent): C, 68.91; H, 6.57; N, 3.65. Found (percent): C, 69.13; H, 6.55; N, 3.47.

(b) Cis - 3 - (N,N - dimethyl-aminomethyl)-1-phenyl-isochroman.—The cis-3-aminomethyl - 1 - phenylisochroman prepared as described in Example 1d, in the form of its hydrochloride salt (0.5 g., 0.00155 mole) is converted to the free base, dissolved in methanol (50 ml.) and condensed with 5 ml. of formaldehyde and 1 ml. of acetic acid. Hydrogenation is then carried out as described in "a" and the product is isolated in the form of its hydrochloride salt, M.P. 243°–248° C.

*Analysis.*—Calculated for $C_{18}H_{22}NOCl$ (percent): C, 71.15; H, 7.30; N, 4.61; Cl, 11.67. Found (percent): C, 70.86; H, 7.25; N, 4.46; Cl, 11.94.

EXAMPLE 4

(a) 6-methoxy - 1 - phenyl - 3 - isochromanone.—To a Dry Ice cooled mixture of 105 g. (0.58 mole) of 3-methoxyphenylacetic acid ethyl ester, 91 g. (0.64 mole) of benzoyl chloride in 600 ml. of carbon disulfide is added 85 g. of aluminum chloride at a rate which maintains the temperature below 20° C. The reaction mixture is stirred at 40° C. overnight. The crude product (ester with excess benzoyl chloride), obtained by extraction into ether, is then subjected to a basic hydrolysis in 200 ml. 6 N sodium hydroxide and 300 ml. methanol at a reflux temperature for 30 minutes. Additional 6 N sodium hydroxide is added to bring the pH to 12–14 range. To the basic solution at room temperature 43.2 g. (excess) of sodium borohydride is added and the reduction is allowed to proceed overnight at room temperature. After removal of methanol and extraction of any neutral products with ether, the basic layer is poured into a hydrochloride mixture to convert the hydroxy acid to the lactone. The 6-methoxy-1-phenyl-3-isochromanone is recovered by extraction into ether and washed several times with saturated sodium bicarbonate. Additional isochromanone is recovered by reextracting the combined aqueous layer with 200 ml. of chloroform. The organic fractions are combined dried over magnesium sulfate and evaporated to a solid residue. Trituration with 1:3 ether-petroleum ether gives off-white crystals, M.P. 127°–130° C.; recrystallized from acetone, heavy prisms, M.P. 133°–135° C.

*Analysis.*—Calculated for $C_{16}H_{14}O_3$ (percent): C, 75.57; H, 5.55. Found (percent): C, 75.21; H, 5.57.

(b) 3 - hydroxy - 6 - methoxy-1-phenylisochroman.— To 87 g. (0.34 mole) of the 6-methoxy-1-phenyl-3-isochromanone dissolved in 1740 ml. of benzene/toluene 50/50 cooled to 5° C. is added 260 ml. (0.542 mole) of diisobutyl aluminum hydride. The disappearance of isochromanone during the addition is followed by thin layer chromatography and the addition of diisobutyl aluminum hydride is stopped when the reaction is complete. The reaction mixture is worked up by decomposition of excess reagent with 60 ml. water per 36 ml. methanol and filtration of the unsoluble salts. Two crops of product 3-hydroxy-6-methoxy-1-phenylisochroman are obtained as a white crystalline mixture of the cis/trans isomers, which yields, when recrystallized from methanol, needles, M.P. 111°–112° C.

*Analysis.*—Calculated for $C_{16}H_{15}O_3$ (percent): C, 74.98; H, 6.29. Found (percent): C, 74.79; H, 6.30.

(c) 6-methoxy - 3 - nitromethyl-1-phenylisochroman.— The condensation of the 3-hydroxy-6-methoxy-1-phenyl-isochroman (70 g., 0.27 mole) with nitromethane (350 ml.) is carried out using trimethylamine-acetic acid (35 g., 35 ml.) as the catalyst. The solution is refluxed for 13 hours, and the product is recovered by crystallization from the oily total product. Nuclear magnetic resonance analysis indicates a 38% trans/62% cis isomer mixture. A small sample of isomeric mixture is recrystallized from benzene-petroleum ether for analysis, M.P. 111°–112° C.

*Analysis.*—Calculated for $C_{16}H_{15}O_3$ (percent): C, 74.98; H, 6.29. Found (percent): C, 74.79; H, 6.30.

(d) 6 - methoxy-3-aminomethyl-1-phenylisochroman.— The catalytic reduction of the nitromethyl compound (10 g., 0.33 mole) is accomplished in tetrahydrofuran (50 ml.) and methanol (150 ml.) at ambient temperature overnight using platinum oxide as the catalyst. The product is isolated as the hydrochloride salt, M.P. 212°–214° C. (50/50 cis/trans).

*Analysis.*—Calculated for $C_{17}H_{19}O_2N \cdot HCl$ (percent): C, 66.77; H, 6.59; N, 4.58; Cl, 11.59. Found (percent): C, 65.92; H, 6.55; N, 4.27; Cl, 11.03.

EXAMPLE 5

(a) 6,7-dimethoxy-1-phenyl-3-isochromanone: A solution of methyl 3,4-dimethoxyphenylacetate (158 g., 0.75 mole), benzoylchloride (96 ml., 0.825 mole), and 1,2-dichloroethane (905 ml.) is cooled to 0° C. (Dry Ice) with stirring and treated with aluminum chloride (110.2 g., 0.825 mole) in portions. The mixture is stirred one hour at ambient temperature and then warmed to 50° C. for three hours. The solution is chilled, then decomposed by dropwise addition of water (300 ml.). Ether (450 ml.) is added, and the mixture shaken and allowed to separate. The organic layer is washer with water, the aqueous upper layer is separated, and the organic layer concentrated in vacuo. Methyl 2-benzoyl-4,5-dimethoxyphenylacetate, the residual oil, is taken up in 6 N sodium hydroxide (425 ml.) and methanol (1.2 l.) refluxed two hours, chilled, and treated dropwise with sodium borohydride (339 ml. of 12% solution in caustic, 1.51 mole) with vigorous stirring. After stirring overnight at ambient temperature, the basic mixture is concentrated in vacuo, washed with ether, and poured carefully into excess concentrated hydrochloric acid-ice which effects conversion of 2-(α-hydroxybenzyl) - 4,5 - dimethoxyphenylacetic acid to the desired product. The orange-brown gum is extracted with chloroform washed with very dilute sodium bicarbonate, dried with magnesium sulfate anhydrous and decolorizing carbon, filtered, and concentrated in vacuo to an oil. The oil is made to crystallize by dissolving in ether, adding a small amount of petroleum ether, and seeding. The solid is collected and dried to give the final product, M.P. 93°–95° C.

(b) 3-hydroxy-6,7-dimethoxy-1-phenyl-3-isochroman.— To a solution of 6,7-dimethoxy-1-phenyl-3-isochromanone (103.5 g., 0.365 mole) in benzene-toluene (1:1) (1.98 l.) chilled to 0° C. with Dry Ice is added dropwise (stirring) diisobutyl aluminum hydride (25% in toluene) (276 ml., 0.42 mole). After stirring in the cold for ~two hours, the solution is decomposed by adding ether (1.2 l.) followed dropwise with methanol (19.7 ml.) and water (26.3 ml.). After stirring several hours, the cloudy solution is treated with anhydrous magnesium sulfate and filtered. The cake is washed with hot methanol. The combined filtrate and washings are concentrated in vacuo to a solid residue which is recrystallized from methanol to give the product M.P. 141°–143° C.

*Analysis.*—Calculated for $C_{17}H_{18}O_4$ (percent): C, 71.31; H, 6.34. Found (percent): C, 71.52; H, 6.33.

(c) 6,7 - dimethoxy - 1 - phenyl-3-nitromethylisochroman.—To a Dry Ice chilled solution of nitromethane (250 ml.) and triethylamine (34 ml.) is added dropwise (stirring) glacial acetic acid (25 ml.). Then 3-hydroxy-6,7-dimethoxy-1-phenyl-3-isochroman (54.8 g., 0.193 mole) is added and the solution refluxed overnight. The cooled solution is diluted with dichloromethane (170 ml.) and washed successively with water, 1 M sodium carbonate 1 N hydrochloric acid and water. The organic layer turns from brown to dark green during the acid wash. After drying, the solution is concentrated in vacuo to an oil which is crystallized from hot isopropyl alcohol containing just enough methanol to prevent oiling.

Two isomers are obtained:

Trans isomer: M.P. 159°–160.5° C.

*Analysis.*—Calculated for $C_{18}H_{19}NO_5$ (percent): C, 65.64; H, 5.81; N, 4.25. Found (percent): C, 65.87; H, 5.86; N, 410.

Cis isomer: M.P. 141°–143° C.

*Analysis.*—Calculated for $C_{18}H_{19}NO_5$ (percent): C, 65.64; H, 5.81; N, 4.25. Found (percent): C, 65.91; H, 5.84; N, 4.04.

(d) 6,7-dimethoxy - 1 - phenyl-3-aminomethylisochroman.—A mixture of 6,7-dimethoxy-1-phenyl-3-nitromethylisochroman (20 g., 0.061 mole) (45/55 isomeric mixture), 5% platinum on carbon (50% w.w.) (32 g.), tetrahydrofuran (110 ml.), and methanol (330 ml.) is hydrogenated in a Parr apparatus. Theoretical uptake takes place over 24 hours. After filtering, the solution is concentrated in vacuo to a green foam. After dissolving in methanol and treating with methanolic hydrogen chloride until acid to Congo Red, the solution is again concentrated in vacuo to a fluff. Crystallization occurs by dissolving in hot ethyl acetate and allowing the solution to cool slowly. The product, as the hydrochloride, is collected and dried, M.P. 188°–192° C. The nuclear magnetic resonance spectra shows the product to be a mixture of isomers in the ratio of 34.6% trans isomer to 65.4% cis isomer.

*Analysis.*—Calculated for $C_{18}H_{22}NClO_3$ (percent): C, 64.38; H, 6.60; N, 4.17; Cl, 10.56. Found (percent): C, 64.80; H, 6.68; N, 4.07; Cl, 10.27.

EXAMPLE 6

(a) 1-phenyl-3-isochromanone.—To 10 g. (0.041 mole) of o-benzoylphenylacetic acid dissolved in 100 ml. of dilute sodium hydroxide (slight excess) is added with stirring 1.6 g. solid (excess) sodium borohydride. After two hours at room temperature, ice is added and the excess sodium borohydride decomposed with 6 N hydrochloric acid (foaming) to pH 1. The oil which separates is extracted with 300 ml. of ether. The ether layer is *not* washed free of acid in order to promote lactone formation. It is evaporated in vacuo to an oil which crystallizes, from ethanol/water. A sample is recrystallized from ethanol, M.P. 73°–74° C.

*Analysis.*—Calculated for $C_{15}H_{12}O_2$ (percent): C, 80.33; H, 5.39. Found (percent): C, 80.18; H, 5.49.

(b) 4 - bromo-1-phenyl-3-isochromanone.—To 4.5 g. (0.02 mole) of the 1-phenyl-3-isochromanone dissolved in 25 ml. of carbon tetrachloride at room temperature is added 1 ml. (equimolar ratio) of bromine. Gentle reflux for 20 minutes completes the reaction (cessation of hydrogen bromide evolution). The solution is evaporated to a viscous oil which is crystallized from methanol, M.P. 98°–103° C.

*Analysis.*—Calculated for $C_{15}H_{11}BrO_2$ (percent): C, 59.42; H, 3.65; O, 10.55. Found (percent): C, 57.70; H, 3.77; O, 10.45.

(c) 4 - piperidino-1-phenyl-3-isochromanone.—A solution of 0.6 g. (2 mmoles) of the 4-bromo-1-phenyl-3-isochromanone in 15 ml. of ether is added with stirring to a solution of 0.5 ml. (4.7 mmole) piperidine in 15 ml. of ether. After 5 minutes at 0° C., the solution is allowed to warm to room temperature during 10 minutes. At that time the piperidine hydrobromide is filtered, the remaining oil on trituration with ether yielding product, which is recrystallized from methanol, M.P. 137°–138° C.

*Analysis.*—Calculated for $C_{20}H_{21}O_2N$ (percent): C, 78.14; H, 6.89; N, 4.56. Found (percent): C, 78.07; H, 7.16; N, 4.36.

(d) 2-piperidino-2-(α - hydroxybenzyl) phenylethyl alcohol.—A dry three-necked flask containing 50 mg. (1.3 mmoles) of lithium aluminum hydride in 10 ml. of ether is added 0.20 g. (0.65 mole) of the 4-piperidino-1-phenyl-3-isochromanone dissolved in 5 ml. of tetrahydrofuran. The mixture is heated to reflux for 90 minutes. The reaction mixture is then cooled to room temperature and treated with 0.4 ml. of isopropyl alcohol and 0.3 ml. of sodium chloride solution. The precipitated solid is filtered and washed with tetrahydrofuran. The combined filtrate and washings are then concentrated under reduced pressure, dissolved in ether, washed with water and dried. The solvent is evaporated in vacuo to yield the product, M.P. 144°–145° C.

*Analysis.*—Calculated for $C_{20}H_{25}NO_2$ (percent): C, 77.13; H, 8.09; N, 4.50. Found (percent): C, 77.55; H, 8.35; N, 4.65.

(e) 1-phenyl-4-piperidylisochroman.—Into a 10 ml. flask is placed 85 mg. (0.27 mmole) of the 2-piperidino-2-(α-hydroxybenzyl) phenylethyl alcohol, 70 mg. (0.37 mmole) of p-toluenesulfonic acid, and 3 ml. of chloroform. The reaction mixture is then heated at reflux for three and one-half hours, followed by cooling to room temperature. The reaction mixture is evaporated under reduced pressure to give an oily residue which is taken up in ether, washed with dilute sodium bicarbonate and water and then evaporated to a colorless oil in vacuo. The product, M.P. 195°–198° C., is obtained as an oxalate.

*Analysis.*—Calculated for $C_{22}H_{25}O_5N$ (percent): C, 68.91; H, 6.57; O, 20.86; N, 3.65. Found (percent): C, 69.36; H, 6.63; O, 20.41; N, 3.48..

EXAMPLE 7

(a) 2-bromo-2-(α-hydroxybenzyl) phenylethyl alcohol.—To 148 g. (0.48 mole) of 4-bromo-1-phenyl-3-isochromanone in 1.5 l. of dry tetrahydrofuran contained in a 3-necked flask is added at 0° C. 2.5 l. of 1 N diborane in tetrahydrofuran. The mixture is then warmed to room temperature and finally refluxed for three days. Water is added to the cooled reaction to decompose the excess diborane and the tetrahydrofuran is mostly evaporated. An additional 500 ml. of water are added and the product is extracted with ether (2× 800 ml.), which is washed, dried and evaporated to 103 g. of a light yellow oil. The product is quite unstable and is carried on to the next step without attempting to crystallize it.

(b) 4 - bromo - 1 - phenylisochroman.—Into a 100 ml. flask is placed 3.1 g. of the crude 2-bromo-(α-hydroxybenzyl) phenylethyl alcohol, 50 ml. of chloroform and 0.5 g. of p-toluenesulfonic acid, and the mixture refluxed for three hours. Upon evaporation of the chloroform, an oil is obtained that is dissolved in ether, washed with 5% sodium bicarbonate and water, dried and evaporated in vacuo to a brown oil that is used in the next step of the reaction sequence without further purification.

(c) Cis - 1 - phenyl-4-piperidyl-isochroman hydrochloride.—To 5 g. of the 4-bromo-1-phenylisochroman in 15 ml. isopropyl alcohol is added 30 ml. (excess) of piperidine. This solution is heated on the steam bath for 1 hour when thin layer chromatography analysis shows the reaction to be complete. Workup of the reaction for amine product gives an oily solid. The basic product is dissolved in ether and crystallized from ether/petroleum ether to give 2 g. of the cis free base, M.P. 125°–126° C.

*Analysis.*—Calculated for $C_{20}H_{23}NO$ (percent): C, 81.87; H, 7.90; N, 4.77; O, 5.45. Found (percent): C, 81.75; H, 7.70; N, 4.89; O, 5.90.

The hydrochloride salt is made in ether, M.P. 215°–218° C.

*Analysis.*—Calculated for $C_{20}H_{23}NO \cdot HCl$ (percent): C, 72.82; H, 7.33; N, 4.25; Cl, 10.75. Found (percent): C, 72.38; H, 7.45; N, 3.81; Cl, 11.51.

From the cis free base crystallization there is obtained the trans hydrochloride, M.P. 240°–244° C.

EXAMPLE 8

Cis- and trans-4-(N,N-dimethylamino-1-phenylisochroman.—The amination of the 4-bromo-1-phenylisochroman is carried out in essentially the same manner as described above in Example 7c. From 20 g. (0.06 mole) of the 4-bromo-1-phenylisochroman there is obtained a light brown oil. Chromatography gives the pure cis/trans amine which is fractionally crystallized from petroleum ether at room temperature. The initial crop is the cis isomer, M.P. 81°–82° C.

*Analysis.*—Calculated for $C_{17}H_{19}ON$ (percent): C, 80.57; H, 7.56; N, 5.53. Found (percent): C, 80.42; H, 7.50; N, 5.51.

The subsequent crop is the pure trans isomer, M.P. 75°–79° C.

*Analysis.*—Calculated for $C_{17}H_{19}ON$ (percent): C, 80.57; H, 7.56; N, 5.53. Found (percent): C, 80.43; H, 7.56; N, 5.68.

Both isomers are converted to the fumarate salts for screening purposes:

Trans—M.P. 164°–168° C.
Cis—M.P. 161°–161° C.

EXAMPLE 9

Cis- and trans-4-aminomethyl-1-phenylisochroman hydrogen fumarate.—A solution of 15 g. (0.046 mole) of 4-bromo-1-phenylisochroman in 40 ml. of isopropyl alcohol and 100 ml. of monomethylamine is heated in a sealed glass tube placed in a steam bath for two hours. The resulting crude base is purified by chromatography on a column of silicic acid/celite with chloroform/5% methanol as the developer (31% trans, 69% cis). The oily free base is converted to the hydrogen fumarate salt in 150 ml. of methanol and allowed to crystallize at room temperature. The first crop of fine needles is the trans-isomer (M.P. 223°–225° C.).

*Analysis.*—Calculated for $C_{16}H_{17}ON \cdot C_4H_4O_4$ (percent): C, 67.59; H, 5.96; N, 3.94. Found (percent): C, 67.14; H, 5.51; N, 3.79.

Evaporation of the solvent to about 80 ml. gives a second crop of needles, which is the pure cis isomer, M.P. 167°–170° C.

*Analysis.*—Calculated for $C_{16}H_{17}ON \cdot C_4H_4O_4$ (percent): C, 67.59; H, 5.96; N, 3.94. Found (percent): C, 67.63; H, 6.01; N, 4.02.

EXAMPLE 10

(a) 4-bromo-1-phenylisochroman.—A solution of crude 2-bromo-2-(α-hydroxybenzyl) phenylethyl alcohol (12 g.), obtained as described in Example 7a above, in chloroform (100 ml.) was saturated with hydrogen bromide gas and allowed to stand at room temperature for four hours. Chromatography on silicic acid/celite yielded a colorless oil (10.2 g., 89%).

(b) 4-cyano-1-phenylisochroman.—To a suspension of dry powdered sodium cyanide (25 g., 0.5 mole) in dry dimethylsulfoxide (200 ml.) was added 4-bromo-1-phenylisochroman (50 g., 0.15 mole). After stirring for 90 minutes at 70° C., the neutral fraction was extracted into ether after addition of water to a dilute aqueous solution (1000 ml.). The ether extract was washed with dilute hydrochloric acid and water, and evaporated to a brown oil (36.6 g.) which consisted of a mixture of two isomers having different melting points. The isomer having the higher melting point (31%), M.P. 153°–156° C., was recovered from the oil by crystallization from benzene/petroleum ether.

*Analysis.*—Calculated for $C_{16}H_{13}ON$ (percent): C, 81.68; H, 5.57; N, 5.95. Found (percent): C, 81.63; H, 5.72; N, 5.53.

(c) Cis-4-aminomethyl-1-phenylisochroman.—To a solution of the 4-cyano-1-phenylisochroman isomer having the higher melting point (112 g., 0.046 mole) dissolved in tetrahydrofuran (130 ml.) at 0° C. was added 1 N diborane in tetrahydrofuran (130 ml.). After stirring 60 minutes at 0° C., and 60 minutes at room temperature, the amine fraction was obtained by treating the reaction mixture with 6 N hydrochloric acid (3 ml.), then refluxing for 60 minutes followed by evaporation of the tetrahydrofuran in vacuo. The aqueous residue was basified with 6 N sodium hydroxide and then extracted with ether. The ether extract was washed three times with water and the basic product extracted from the ether with 1 N hydrochloric acid. Final workup yielded 9.9 grams of solid product which upon recrystallization from tetrahydrofuran/ether yielded 7.7 g. of fine colorless needles, M.P. 107°–109° C.

*Analysis.*—Calculated for CHON (percent): C, 80.30; H, 7.16; N, 5.85. Found (percent): C, 79.81; H, 6.99; N, 5.98.

EXAMPLE 11

(a) Cis-4-(N-methylaminomethyl)-1-phenylisochroman.—In the same manner as described in Example 3, the cis-4-aminomethyl-1-phenylisochroman isomer having the higher melting point (4.5 g., 0.019 mole), and prepared as described in Example 6, was first converted to the intermediate 4-(N-carbethoxyaminomethyl)-1-phenylisochroman (4.4 g., 74.6%), M.P. 65°–67° C.

*Analysis.*—Calculated for $C_{19}H_{21}NO_3$ (percent): C, 73.29; H, 6.80; N, 4.50. Found (percent): C, 72.61; H, 6.65; N, 4.45.

This intermediate was then reduced by the use of diborane in tetrahydrofuran and the corresponding 4-aminomethyl-1-phenylisochroman isomer obtained in the form of its hydrochloride salt, M.P. 248°–250° C.

*Analysis.*—Calculated for $C_{17}H_{19}NO \cdot HCl$ (percent): C, 70.45; H, 6.96; N, 4.83; Cl, 12.24. Found (percent): C, 70.42; H, 6.62; N, 4.72; Cl, 12.10.

(b) Trans-4-(N-methylaminomethyl)-1-phenylisochroman.—In the same manner as described in Example 2, the trans-4-aminomethyl-1-phenylisochroman isomer having the lower melting point (1.0 g., 0.004 mole) was converted to the intermediate 4-(N-carbethoxyaminomethyl)-1-phenylisochroman, M.P. 130°–132° C.

*Analysis.*—Calculated for $C_{17}H_{19}NO_3$ (percent): C, 73.29; H, 6.80; N, 4.50. Found (percent): C, 73.30; H, 6.65; N, 4.44.

This intermediate was then reduced as in Example 11a, part 2, and the corresponding 4-aminomethyl-1-phenylisochroman isomer obtained in the form of its hydrochloride salt, M.P. 212°–215° C.

*Analysis.*—Calculated for $C_{17}H_{19}NO \cdot HCl$ (percent): C, 70.45; H, 6.96; N, 4.83; Cl, 12.24. Found (percent): C, 70.68; H, 7.05; N, 4.72; Cl, 12.42.

EXAMPLE 12

(a) 4-(N,N-dimethylaminomethyl)-1-phenylisochroman.—In the same manner as described in Example 3a, the cis-4-aminomethyl-1-phenylisochroman isomer having the higher melting point (3.7 g., 0.0155 mole) was methylated to yield the 4-(N,N-dimethylaminomethyl)-1-phenylisochroman in the form of its hydrochloride salt, M.P. 242°–247° C.

*Analysis.*—Calculated for $C_{18}H_{21}NO \cdot HCl$ (percent): C, 71.15; H, 7.30; N, 4.61; Cl, 11.67. Found (percent): C, 71.47; H, 7.32; N, 4.54; Cl, 11.00.

(b) 4 - (N,N - dimethylaminomethyl) - 1 - phenylisochroman: In the same manner as in Example 3a, the trans-4-aminomethyl-1-phenylisochroman isomer having the lower melting point was converted to the corresponding 4 - (N,N-dimethylaminomethyl)-1-phenylisochroman isomer in the form of its hydrochloride salt, M.P. 275°–276° C.

*Analysis.*—Calculated for $C_{18}H_{21}NO \cdot HCl$ (percent): C, 71.15; H, 7.30; N, 4.61; Cl, 11.67. Found (percent): C, 70.75; H, 7.53; N, 4.49; Cl, 12.11.

EXAMPLE 13

Cis and trans 4-(N-methylamino) - 1 - phenylisochroman.—A solution of 4-bromo-1-phenylisochroman (15 g., 0.046 mole), obtained as described in Example 7b, in isopropanol (40 ml.) and monomethylamine (100 ml.) was heated in a sealed glass tube placed in a steam bath for two hours. The resulting crude base (9.6 g.) was purified by chromatography on a column of silicic acid/Celite with chloroform/5% methanol as the developer to yield 8.8 g. of an oil which comprised a mixture of two isomers having different melting points. The mixture was resolved by fractional crystallization to yield the cis-4-(N-methylamino) - 1 - phenylisochroman isomer having the higher melting point in the form of its fumarate salt, M.P. 223°–225° C.

*Analysis.*—Calculated for $C_{16}H_{17}On \cdot C_4H_4O_4$ (percent): C, 67.59; H, 5.96; N, 3.94. Found (percent): C, 67.14; H, 5.51; N, 379.

The trans-4-(N-methylamino)-1-phenylisochroman isomer having the lower melting point was obtained in the form of its fumarate salt, M.P. 167°–170° C.

*Analysis.*—Calculated for $C_{16}H_{17}No \cdot C_4H_4O_4$ (percent): C, 67.59; H, 5.96; N, 3.94. Found (percent): C, 67.63; H, 6.01; N, 4.02.

EXAMPLE 14

4 - (N,N-dimethylamino)-1-phenylisochroman.—Using essentially the same amination method as described in Example 7, 4-bromo-1-phenylisochroman (20 g., 0.06 mole) and dimethylamine yielded 14 g. (91%) of a light brown oil. After chromatography, fractional crystallization gave 2.9 g. of the cis - 4 - (N,N-dimethylamino)-1-phenylisochroman isomer having the higher melting point, M.P. 81°–82° C.

*Analysis.*—Calculated for $C_{17}H_{19}NO$ (percent): C, 80.57; H, 7.56; N, 5.53. Found (percent): C, 80.42; H, 7.50; N, 5.51.

The trans - 4 - (N,N-dimethylamino)-1-phenylisochroman isomer having the lower melting point was obtained in a yield of 2.7 g.

*Analysis.*—Calculated for $C_{17}H_{19}NO$ (percent): C, 80.57; H, 7.56; N, 5.68. Found (percent): C, 80.43; H, 7.56; N, 5.68.

EXAMPLE 15

(a) 2-(chloromethyl) phenethyl alcohol.—To 84 ml. (0.25 mole, 3 M solution) of ethereal phenyl magnesium bromide is added with stirring 30 ml. of p-dioxane. To the resulting pasty mixture is then slowly added a solution of 47 g. (0.5 mole) of epichlorohydrin in 45 ml. of anhydrous diethyl ether to maintain a gentle reflux. The reaction is carried out under nitrogen atmosphere with ice bath cooling available for controlling the rate of reflux. After refluxing for 18 hours, the reaction complex is decomposed by addition of 170 ml. of 3 N sulfuric acid. The organic layer is washed successively with water, dilute aqueous sodium carbonate and water, dried over anhydrous magnesium sulfate and the solvent removed in vacuo. Distillation gives the product B.P. 86°–130° C./3.1–3.4 mm.

(b) 3-chloromethyl-1-phenylisochroman.—A mixture of 1-(chloromethyl) phenethyl alcohol (17.05 g., 0.1 mole), benzaldehyde (21.2 g., 0.2 mole) and anhydrous zinc chloride (94 g.) is saturated with gaseous hydrogen chloride (temperature rose to $-40°$ C.). The bubbling with stirring is continued for five hours while heating in an oil bath at 60°–65° C. The cooled reaction mixture is poured in 250 ml. of ice water and extracted with two portions of ether. Extract washed with dilute aqueous sodium carbonate and then with water, dried over anhydrous magnesium sulfate and the solvent removed in vacuo. Distillation gives the product, B.P. 175°–181° C./2.3 mm. which crystallized on cooling.

(c) Cis-3-methylamino-1-phenylisochroman hydrochloride.—A steel bomb is charged with cis-3-chloromethyl-1-phenylisochroman (4.0 g., 0.0154 mole), liquid ammonia (20 ml.) and 25 ml. of absolute ethanol. The mixture is then cooked at 100° C. for 1 hour. The reaction mixture is pulled down to an oil, taken up in 10% aqueous sodium hydroxide and covered with ether. The organic extract is washed with water, dried over anhydrous magnesium sulfate and bubbled with hydrogen chloride gas to give the product.

EXAMPLE 16

(a) 3-chloro-2-methyl - 1,2 - epoxybutane.—Methallyl chloride is heated with excess peracetic and sodium acetate in acetic acid at 40° for two hours. The product is obtained by petroleum ether extraction in nearly quantitative yield as determined by gas chromatography.

(b) 1-chloro-2-methyl - 3 - phenyl - 2 - propanol.—The 3-chloro-2-methyl-1,2-epoxybutane is added to an equimolar amount of phenyl Grignard in dioxane/ether. After three hours at 0°–25° C., the usual workup affords an oil which after fractional distillation yields a colorless oil, B.P. 110°–115° C. at 2.0 mm.

(c) 3-chloromethyl - 3 - methyl - 1 - isochroman.—The 2-chloro-2-methyl-2-phenyl-2-propanol is condensed with benzaldehyde as described in Example 15b to yield an oil which upon distillation or column chromatography yields 50% crystalline product, M.P. 83°–84.5° C., pure cis isomer.

(d) Cis-3-methylaminomethyl - 1 - phenyl-3-isochroman fumarate.—The 3-chloromethyl - 3 - methyl-1-phenylisochroman compound is converted to the amine by heating in a bomb with ammonia in ethanol for five days at 250° C. The oily free base is treated with fumaric acid in ether to yield, upon recrystallization from acetone/ether, the crystalline pure cis isomer, M.P. 141°–143° C.

*Analysis.*—Calculated for $C_{21}H_{23}NO_5$ (MW 369.42) (percent): C, 68.28; H, 6,27; N, 3.79. Found (percent): C, 68.46; H, 6.63; N, 3.90.

By following essentially the same procedure as that of Examples 15a and 16 are obtained the following intermediates and final products.

EXAMPLE 17

(a) 3-chloromethyl-6-fluoro-1-phenylisochroman, M.P. 88°–91° C.

(b) 6-fluoro-3-aminomethyl-1phenylisochroman hydrochloride, M.P. 208°–210° C.

*Analysis.*—Calculated for $C_{16}H_{17}NOClF$ (percent): C, 65.42; H, 5.83; N, 4.77. Found (percent): C, 65.21; H, 5.71; N, 4.76.

EXAMPLE 18

Cis-3-(1-piperidylmethyl) - 1 - phenylisochroman hydrochloride, M.P. 226.5°–228° C.

EXAMPLE 19

Cis - 3 - (1 - pyrrolidinomethyl) - 1 - phenylisochroman hydrochloride, M.P. 217°–219° C.

EXAMPLE 20

3-(N-isopropylaminomethyl)-1-phenylisochroman hychloride, M.P. 142°–217° C.

EXAMPLE 21

3-(N-propylaminomethyl)-1-phenylisochroman hydrochloride, M.P. 145°–147° C.

EXAMPLE 22

Cis-3-(N - isobutylaminomethyl)-1-phenylisochroman hydrochloride, M.P. 142° C.

EXAMPLE 23

(a) Cis-3-chloromethyl-1-phenylchroman.—1-(chloromethyl)-phenethyl alcohol (501. g., 2.94 mole), 624 g. (5.88 mole) benzaldehyde and 136 g. anhydrous zinc chloride are mixed together then saturated with hydrogen chloride gas while being stirred. The gas is bubbled through the mixture for six hours while being heated at 60°–65° C. The reaction is then poured into 2 l. of ice water. The oily product is extracted into ether, washed with water, dilute sodium carbonate and water dried over magnesium sulfate. The excess ether is removed and the benzaldehyde distilled off in vacuo. The residue is dissolved in 1.7 l. of hexane and chilled overnight. The resulting dark precipitate is dissolved in methylene chloride and decolorized with Darco G–60 (activated charcoal). Removal of the methylene chloride leaves an oil which solidified upon cooling. The solid is washed with petroleum ether (30°–60° C.). Yield is a product 91% cis and 9% trans. The product is dissolved in benzene and passed through a column of 1500 g. of magnesium silicate. Removal of the benzene leaves −180 g. of 100% cis product.

(b) Cis-3-aminomethyl-1-phenyl-3-isochroman hydrochloride, M.P. 221°–214° C.

EXAMPLE 24

(a) Cis-3-(N-ethylamino)-1-phenylisochroman hydrochloride, M.P. 229°–236° C.

(b) Trans-3-(N-ethylamino)-1-phenylisochroman hydrochloride, M.P. 229°–236° C.

EXAMPLE 25

(a) Cis-/trans-1-phenylisochroman-3-carboxylic acid.— A mixture of two moles of benzaldehyde, 1 mole of dl-phenylocetyl-phenylacetic acid, and 0.3 mole of zinc chloride is heated and stirred at 50° C. while treating with gaseous hydrogen chloride for five hours. The product is extracted with dilute sodium hydroxide and precipitated by pouring into cold dilute hydrochloride, to yield crystalline prisms, M.P. 141°–144° C., 50/50 cis/trans. A sample recrystallized from 80% ethanol had M.P. 145°–144° C.

*Analysis.*—Calculated for $C_{14}H_{14}O_3$ (254.27) (percent): C, 75.57; H, 5.55. Found (percent): C, 75.69; H, 5.67.

(b) Fractional crystallization of 1-phenyl-3-isochromancarboxylic acid.—The 50/50 isomeric mixture of crystalline acid, upon slow recrystallization from acetone yields a 90% pure trans isomer, plates M.P. 174°–178° C. The residual oil gives, upon recrystallization from isopropanol water, 95% pure cis isomer, needles, M.P. 162°–164° C.

(c) Cis/trans - 3-carboxamido-1-phenylisochroman.— The cis/trans acid is treated with an excess of thionyl chloride in refluxing methylenechloride, the solvent evaporated and the residual acid chloride dissolved in ether and cooled to 0° C., an excess of concentrated ammonium hydroxide is added slowly and the slurry stirred at 0° C. for 15 minutes. The white precipitate is filtered and washed with water and ether, M.P. 143°–205° C. Recrystallization from methanol gives colorless plates with two sharp melting points, 196°–197° C. and 202°–205° C., 50/50 cis/trans.

*Analysis.*—Calculated for $C_{16}H_{15}NO_2$ (253.50) (percent): C, 75.87; H, 5.97; N, 5.53. Found (percent): C, 75.52; H, 6.10; N, 5.98.

(d) Cis/trans - 3 - cyano-1-phenylisochroman.—The crude isomeric amide is heated with an equimolar amount of p-toluenesulfonylchloride in pyridine for 4.5 hours at 110°–120° C. Workup by ether extraction gives 92% crystalline product, sufficiently pure for the next step. A sample recrystallized from ether/petroleum ether gives colorless prisims, M.P. 98°–104° C.

*Analysis.*—Calculated for $C_{16}H_{13}NO$ (235.28) (percent): C, 81.68; H, 5.57; N, 5.95. Found (percent): C, 81.45; H, 5.58; N, 5.67.

(e) Cis/trans, 3 - [2 - (2-imidazolinyl)]-1-phenylisochroman hydrochloride.—The nitrile is heated with 0.5 mole ethylenediamine and 0.5 mole ethylenediamine dihydrochloride at 200° C. for 1.5 hours. Workup by extraction for the basic product yields crystalline free base (50/50 cis-trans). The free base is converted quantitatively to the hydrochloride; a sample recrystallized from ethanol/ether has M.P. 248°–250° C.

*Analysis.*—Calculated for $C_{18}H_{18}NO_2HCl$ (314.82) (percent): C, 68.67; H, 6.08; N, 8.90. Found (percent): C, 68.56; H, 6.39; N, 8.41.

(f) Cis - 3-[2 - (2-imidazolinyl)]-1-phenylisochroman hydrochloride.—The cis isomer is obtained in 95% purity by fractional crystallization of the cis/trans hydrochloride from ethanol ether, plates M.P. 251°–253° C.

(g) Cis/trans (in 4:1 ratio) 1-phenyl-3-isochromancarboxamidine hydrochloride.—The nitrile is stirred with an equimolar amount of sodium methoxide in dry methanol for 48 hours at 25° C., a slight excess of ammonium chloride added, stirred an additional three hours, then solvents evaporated to yield crude hydrochloride. The product is washed with water and recrystallized from ethanol/chloroform, colorless prisms M.P. 256°–258° C., 80/20 cis/trans.

*Analysis.*—Calculated for $C_{16}H_{16}N_2O \cdot HCl$ (288.78) (percent): C, 66.55; H, 5.93; N, 9.70. Found (percent): C, 66.31; H, 5.91; N, 9.66.

EXAMPLE 26

(a) 1-chloro-3-(4-fluorophenyl)-2-propanol.—This intermediate is prepared according to the method of Example 15a, B.P. 91°–123° C./325–800 microns.

(b) Cis - 3 - chloromethyl - 7-fluoro-1-phenylisochroman.—This intermediate is prepared according to the method of Example 15b. Isolation by fractional distillation gives the desired product, B.P. 190°–210° C./200–300 microns, greater than 98% cis according to nuclear magnetic resonance analysis.

(c) Cis - 7 - fluoro - 3 - N-methylamino-1-phenylisochroman hydrochloride.—A 2-gallon autoclave is charged with cis - 3 - chloromethyl-7-fluoro-1-phenylisochroman (350 g., 126 moles), anhydrous liquid ammonia (1400 ml.) and 3.2 l. of absolute ethanol. The mixture is then stirred at 150° C. for 16 hours. The reaction mixture is evaporated under vacuum to an oil, taken up in 10% aqueous sodium hydroxide and extracted with diethyl ether. The organic extract is washed with water, dried over anhydrous magnesium sulfate and treated with hydrogen chloride gas to give the product. The product is recrystallized from ethanol-diethyl ether (1:1), M.P. 227.5°–228° C.

(d) Trans - 3 - chloromethyl - 7 - fluoro-1-phenylisochroman.—This intermediate is obtained by fractional crystallization from hexane from the lower boiling cis isomer and has a M.P. 83°–84° C. The trans structure is established by nuclear magnetic resonance analysis.

(e) Trans - 7 - fluoro - 3-N-methylamino-1-phenylisochroman hydrochloride.—This compound is prepared from the intermediate of (d) by the method of (c), M.P.

194°–195° C. Structure confirmed by nuclear magnetic resonance spectral analysis and elemental analysis:

Calculated for $C_{16}H_{16}FNO \cdot HCl$ (percent): C, 65.4; H, 5.83. Found (percent): C, 65.4; H, 5.96.

The following compounds of the invention are prepared according to the methods described hereinabove as noted in the table.

TABLE A

| Example number | Compound | Melting point (in °C.) | Method of Example |
|---|---|---|---|
| 27 | 3-aminomethyl-1-(4-methylphenyl) isochroman hydrochloride. | 213–218 | 15 |
| 28 | 3-aminomethyl-1-(2-methylphenyl) isochroman hydrochloride. | 214–219 | 15 |
| 29 | 3-aminomethyl-1-(4-chlorophenyl) isochroman. | 215–220 | 1 |
| 30 | 70:30 cis:trans-3-(N,N-dimethylaminomethyl)-1-(4-chlorophenyl) isochroman hydrochloride. | 203–206 | 3 |
| 31 | 3-aminomethyl-1-(2-chlorophenyl) isochroman hydrochloride. | 222–225 | 15 |
| 32 | cis-3-aminomethyl-1-(4-fluorophenyl) isochroman hydrochloride. | 243–244 | 15 |
| 33 | cis-3-(N,N-dimethylaminomethyl)-1-(4-chlorophenyl) isochroman hydrochloride. | 265–265 | 3 |
| 34 | trans-3-(N,N-dimethylaminomethyl)-1-(4-chlorophenyl) isochroman hydrochloride. | 181–184 | 3 |
| 35 | 3-aminomethyl-1-(4-trifluoromethylphenyl) isochroman hydrochloride. | 175–177 | ¹1 |
| 36 | 3-aminomethyl-1-(4-aminophenyl) isochroman dihydrochloride hemihydrate. | 220 (d). | 15 |
| 37 | 3-amipomethyl-1-[4-(N,N-dimethylamino) phenyl] isochroman dihydrochloride dihysrate. | 175–180 (d.) | 15 |
| 38 | 3-aminomethyl-7-methyl-1-phenyl-isochroman hydrochloride. | 210–212 | 15 |
| 39 | 3-aminomethyl-6-hydroxy-1-phenyl-isochroman hydrochloride. | 231–234 | ²2 |
| 40 | 40:60 cis:trans-3-aminomethyl-7-chloro-1-phenylisochroman hydrochloride. | 197–198 | 1 |
| 41 | 3-aminomethyl-6-chloro-1-phenyl-isochroman hydrochloride. | 230–232 (d.) | 15 |
| 42 | 3-[N-(2-hydroxyethyl)-aminomethyl]-1-phenylisochroman hydrochloride. | 193–184 | 15 |
| 43 | 3-(2-aminoethyl)-1-phenyl isochroman. | 232.5–235 | 15 |
| 44 | 3-(1-aminoethyl)-1-phenylisochroman oxalate hydrate. | 170–173 | 15 |
| 45 | trans-3-(1-aminoethyl)-1-phenylisochroman. | 229–236 | 15 |
| 46 | cis-3-(1-aminoethyl)-1-phenylisochroman hydrochloride. | 206–213 | 15 |
| 47 | cis-3-(N,N-dimethylaminomethyl)-6-methoxy-1-phenylisochroman fumarate. | 167–168.5 | 3 |
| 48 | 3-(1-morpholinomethyl)-1-phenyl-isochroman hydrochloride. | 243–244 | 15 |
| 49 | 3-[1-(4-methylpiperazinyl) methyl]-1-phenylisochroman hydrochloride. | 208 (d) | 15 |
| 50 | 1-cis-3-aminomethyl-1-phenylisochroman hydrochloride.³ | 229–230 | ⁴3 |
| 51 | d-cis-3-aminomethyl-1-phenylisochroman hydrochloride. | 229.5–230.5 | ⁴3 |

¹ The amide prepared according to Example 25 was reduced with diborane.
² This compound is prepared from compound of Example 4 by reaction with $BBr_3$ in dichloromethane.
³ Specific rotation: $[\alpha]_D^{25°C}$ ethanol = −65.5.
⁴ Resolution by formation of the salt with dibenzoyl-d-tartaric acid followed by fractional crystallization.
⁵ Specific rotation: $[\alpha]_D^{25°C}$ ethanol = +65.5.

What is claimed is:
1. A compound of the formula

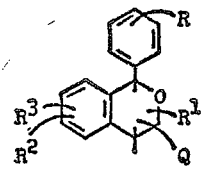

wherein R is hydrogen, lower alkyl, halogen, trifluoromethyl, amino, N-lower alkylamino or N,N-di-lower alkylamino; $R^1$ is hydrogen or lower alkyl, $R^2$ and $R^3$ are each hydrogen, lower alkyl, lower alkoxy, hydroxy, halogen or trifluoromethyl and Q is a radical attached to either the 3 or 4 position, having the structure

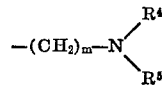

wherein $R^4$ and $R^5$ are independently hydrogen, lower alkyl or hydroxy-lower alkyl or, when taken together with the nitrogen atom to which they are attached, form piperidino, morpholino, piperazino, pyrrolidino or imidazolino ring; m is zero to 4 and when m is 1 or more the alkylene chain may contain a substituent methyl group; and their acid addition and quaternary ammonium salts.

2. A compound of the formula

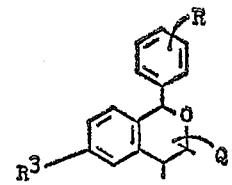

wherein R is hydrogen or p-fluoro, $R^3$ is 7-fluoro, Q is amino, methylamino and dimethylamino; and acid addition salts thereof.

3. A compound of the formula

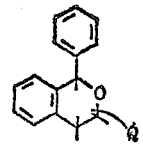

wherein Q is amino, amino-lower alkyl, lower alkylamino-lower alkyl or di-lower alkylamino-lower alkyl; and pharmaceutically acceptable acid addition salts thereof.

4. 3 - methylamino - 1 - phenylisochroman according to claim 1.

5. 3 - methylamino-1-phenylisochroman hydrochoride according to claim 1.

6. 3 - N-lower alkylaminomethyl)-1-phenylisochroman according to claim 1.

7. The compound according to claim 6 wherein "lower alkyl" is methyl.

8. 3 - N,N - di-lower alkylaminomethyl)-1-phenylisochroman according to claim 1.

9. The compound according to claim 8 wherein "lower alkyl" is methyl.

10. 4 - aminomethyl-1-phenylisochroman according to claim 1.

11. 4-aminomethyl-1-phenylisochroman fumarate according to claim 1.

12. 4 - (N - lower alkylaminomethyl) - 1-phenylisochroman according to claim 1.

13. The compound according to claim 12 wherein "lower alkyl" is methyl.

14. 4 - (N,N - di - lower alkylaminomethyl)-1-phenylisochroman according to claim 1.

15. The compound according to claim 14 wherein "lower alkyl" is methyl.

16. 4-amino-1-phenylisochroman according to claim 1.

17. 4 - (N - lower alkylamino)-1-phenylisochroman according to claim 1.

18. The compound according to claim 17 wherein "lower alkyl" is methyl.

19. 4 - (N,N - di-lower alkylamino) - 1 - phenylisochroman according to claim 1.

20. The compound according to claim 19 wherein "lower alkyl" is methyl.

21. 3 - (N - lower alkylaminoalkyl) - 1 - phenylisochroman according to claim 1.

22. 3 - (N,N - di - lower alkylaminoalkyl)-1-phenylisochroman according to claim 1.

23. 4 - (N - lower alkylaminoalkyl) - 1 - phenylisochroman according to claim 1.

24. 4 - (N,N - di - lower alkylaminoalkyl)-1-phenylisochroman according to claim 1.

25. 7 - fluoro - 3 - aminomethyl-1-phenylisochroman hydrochloride according to claim 1.

26. 7 - fluoro - 3 - aminomethyl-1-phenylisochroman according to claim 1.

27. 3 - (N,N - dimethylaminomethyl) - 1 - phenylisochroman according to claim 1.
28. 3 - (N,N - dimethylaminomethyl) - 1 - phenylisochroman hydrochloride according to claim 1.
29. 6 - methoxy - 3-aminomethyl-1-phenylisochroman according to claim 1.
30. 6 - methoxy - 3-aminomethyl-1-phenylisochroman hydrochloride according to claim 1.
31. 6 - hydroxy-3-aminomethyl-1-phenylisochroman according to claim 1.
32. 6 - chloro-3-aminomethyl-1-phenylisochroman according to claim 1.
33. 6,7-dimethoxy-3-aminomethyl - 1 - phenylisochroman according to claim 1.
34. 7 - methyl-3-aminomethyl-1-phenylisochroman according to claim 1.
35. 7 - chloro-3-aminomethyl-1-phenylisochroman according to claim 1.
36. 3 - aminomethyl-1-(4-fluorophenyl)isochroman according to claim 1.
37. 3 - aminomethyl-1-(4-fluorophenyl)isochroman hydrochloride according to claim 1.
38. 3 - aminomethyl-(4-chlorophenyl)isochroman according to claim 1.
39. 3 - aminomethyl-(4-chlorophenyl)isochroman hydrochloride according to claim 1.
40. 3-aminomethyl-1-(p-tolyl)isochroman according to claim 1.
41. 3 - aminomethyl-1-(p-tolyl)isochroman hydrochloride according to claim 1.
42. 3-aminomethyl-1-(o-tolyl)isochroman according to claim 1.
43. 3 - aminomethyl-1-(o-tolyl)isochroman hydrochloride according to claim 1.
44. 3 - (N-ethylaminomethyl)-1-phenylisochroman according to claim 1.
45. 3 - aminomethyl-3-methyl-1-phenylisochroman according to claim 1.
46. 3 - aminomethyl-3-methyl-1-phenylisochroman fumarate according to claim 1.
47. 3 - morpholinomethyl-1-phenylisochroman according to claim 1.
48. 3 - morpholinomethyl-1-phenylisochroman hydrochloride according to claim 1.
49. 3-N-(2-hydroxyethylaminomethyl) - 1 - phenylisochroman according to claim 1.
50. 3-N-(2-hydroxyethylaminomethyl) - 1 - phenylisochroman hydrochloride according to claim 1.
51. 3-(4-methyl-1-piperazinyl methyl) - 1 - phenylisochroman according to claim 1.
52. 4-(N-methylamino)-1-phenylisochroman according to claim 1.
53. 4-(N-methylamino)-1-phenylisochroman fumarate according to claim 1.
54. 4-(N-methylaminomethyl)-1-phenylisochroman according to claim 1.
55. 4-(N-methylaminomethyl) - 1 - phenylisochroman hydrochloride according to claim 1.
56. 4-(N,N-dimethylaminomethyl) - 1 - phenylisochroman according to claim 1.
57. 4-(N,N-dimethylaminomethyl) - 1 - phenylisochroman hydrochloride according to claim 1.
58. 4-piperidyl - 1 - phenylisochroman according to claim 1.
59. 4-piperidyl-1-phenylisochroman hydrochloride according to claim 1.
60. 3 - (2-imidazolinyl)-1-phenylisochroman according to claim 1.
61. 3-(2-imidazolinyl)-1-phenylisochroman hydrochloride according to claim 1.
62. Cis - 3 - aminomethyl-7-fluoro-1-phenylisochroman according to claim 1.
63. Cis - 3 - aminomethyl-7-fluoro-1-phenylisochroman hydrochloride according to claim 1.
64. Trans-3-aminomethyl-7-fluoro - 1 - phenylisochroman according to claim 1.
65. Trans-3-aminomethyl-7-fluoro - 1 - phenylisochroman hydrochloride according to claim 1.
66. 3-aminomethyl - 1 - (4-trifluoromethylphenyl)isochroman according to claim 1.
67. 3-aminomethyl - 1 - (4-trifluoromethylphenyl)isochroman hydrochloride according to claim 1.
68. 3-aminomethyl - 6 - fluoro-1-phenylisochroman according to claim 1.
69. 3-aminomethyl-6-fluoro - 1 - phenylisochroman hydrochloride according to claim 1.
70. *l* - Cis-3-aminomethyl-1-phenylisochroman according to claim 1.
71. *d* - Cis-aminomethyl-1-phenylisochroman according to claim 1.
72. 3 - aminomethyl-1-(4-chlorophenyl)isochroman according to claim 1.
73. 3 - aminomethyl-1-(2-chlorophenyl)isochroman according to claim 1.
74. 3-aminomethyl-1-(2-chlorophenyl)isochroman hydrochloride according to claim 1.
75. 3-hydroxy-1-phenylisochroman.
76. 3-nitromethyl-1-phenylisochroman.
77. 4-bromo-1-phenylisochroman.
78. 4-cyano-1-phenylisochroman.
79. 4-bromo-1-phenylisochroman-3-one.

References Cited

Campbell et al. (1968), article abstracted in Chemical Abstracts, vol. 70, pages 308-9, abstract 96463x (1969).

JOHN M. FORD, Primary Examiner

U.S. Cl. X.R.

260—343.2 R, 293.58, 247.5 B, 268 BC, 247.7 G, 309.6, 326.3; 424—283

UNITED STATES PATENT OFFICE
CERTIFICATE OF CORRECTION

Patent No. 3,743,659          Dated July 3, 1973

Inventor(s) Murle W. Klohs and Francis J. Petracek

It is certified that error appears in the above-identified patent and that said Letters Patent are hereby corrected as shown below:

Column 10, line 60, for "for" read --are-- .
Column 11, line 71, for "products" read --product-- .
Column 15, line 11, for "410" read --4.10-- .
Column 18, line 24, for "CHON" read --C H ON-- .
Column 19, line 33, for "379" read --3.79-- .
Column 23, line 36, for "193-184" read --183-184--
Column 23, line 49, after "hydrochloride" insert --$\frac{5}{}$-- .

Signed and sealed this 19th day of March 1974.

(SEAL)
Attest:

EDWARD M. FLETCHER, JR.          C. MARSHALL DANN
Attesting Officer                Commissioner of Patents